United States Patent [19]

Anderson, deceased et al.

[11] 3,921,792

[45] Nov. 25, 1975

[54] FLEXIBLE LINK CONNECTING STRUCTURE FOR CONVEYOR

[76] Inventors: William S. Anderson, deceased, late of Moses Lake, Wash.; by Marietta H. Anderson, heir, 4504 Fairchild Lane, Moses Lake, Wash. 98837

[22] Filed: Nov. 5, 1973

[21] Appl. No.: 412,582

[52] U.S. Cl. ............................ 198/189; 74/250 C
[51] Int. Cl.² ........................................ B65G 17/08
[58] Field of Search .. 198/189, 193; 74/249, 250 R, 74/250 C, 245 P; 267/152

[56] References Cited
UNITED STATES PATENTS

| | | | |
|---|---|---|---|
| 2,551,578 | 5/1951 | Bendall | 74/250 R |
| 2,769,346 | 11/1956 | Flocke | 74/250 R |
| 2,951,578 | 9/1960 | Hibbard | 198/189 |
| 3,187,072 | 6/1965 | Morin | 74/245 P |
| 3,359,815 | 12/1967 | Jeffrey | 74/250 R |

Primary Examiner—Evon C. Blunk
Assistant Examiner—Richard K. Thomson
Attorney, Agent, or Firm—Leo Gregory

[57] ABSTRACT

A flexible link connecting structure as for a conveyor such as is used with a potato combine in which the links comprise parallel rods and the connecting structure consists of overlapping pairs of connecting members each formed as a pair of substantially cylindrical portions of a rubber composition material hinged in closely spaced relation by a flexible web portion, said cylindrical portions each having an axial bore of a lesser diameter than that of each of said rods whereby end portions of said rods are disposed within said bores in a nonrotating pressure fit and a plate spring member is embedded in each of said connecting members disposed through each of said web portions and having end portions thereof spaced from and substantially encircling each of said bores.

9 Claims, 8 Drawing Figures

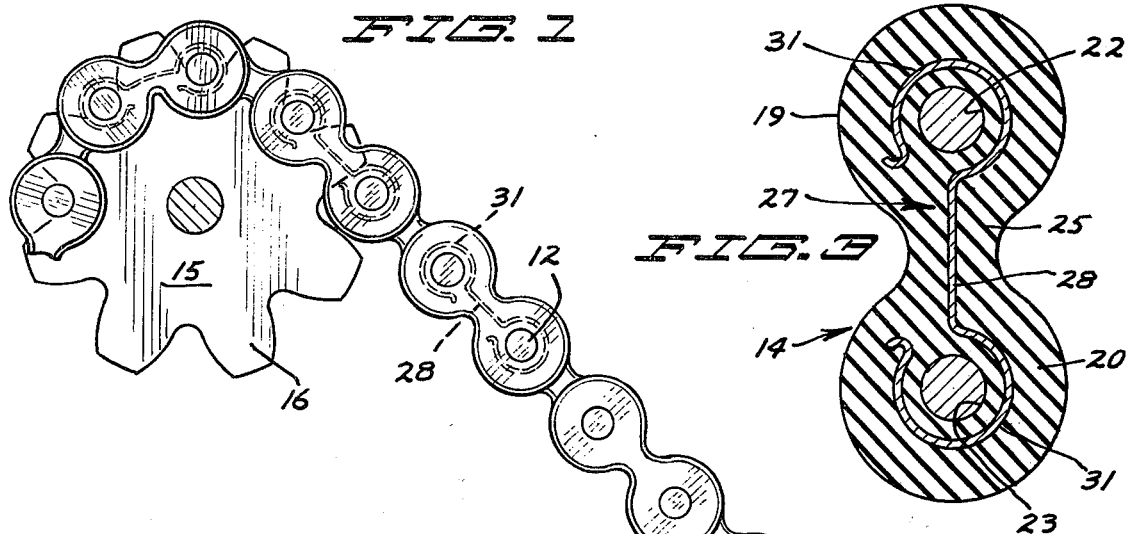
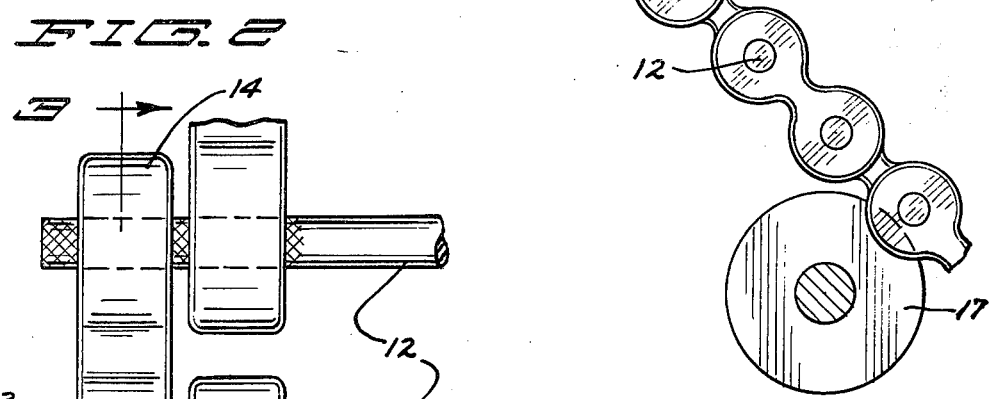
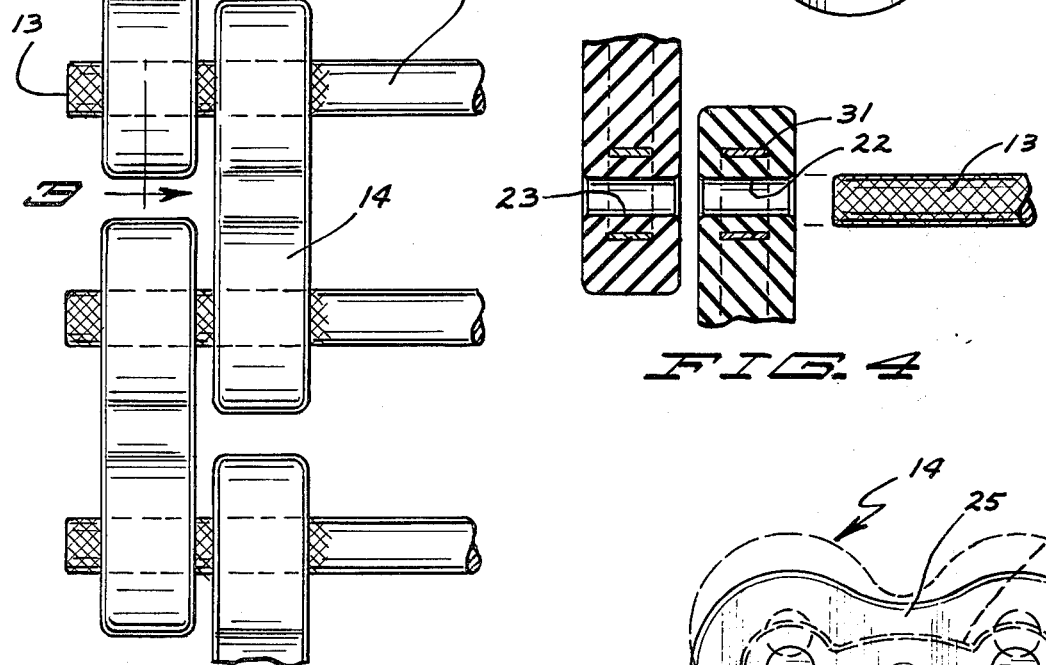
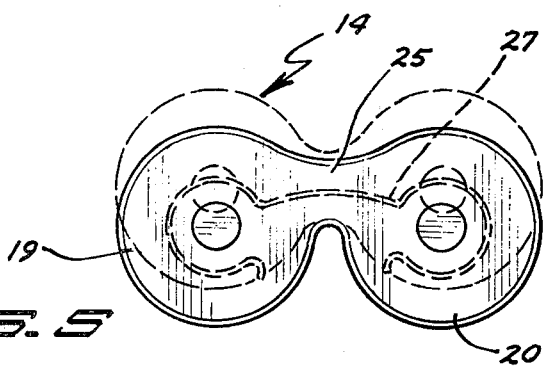

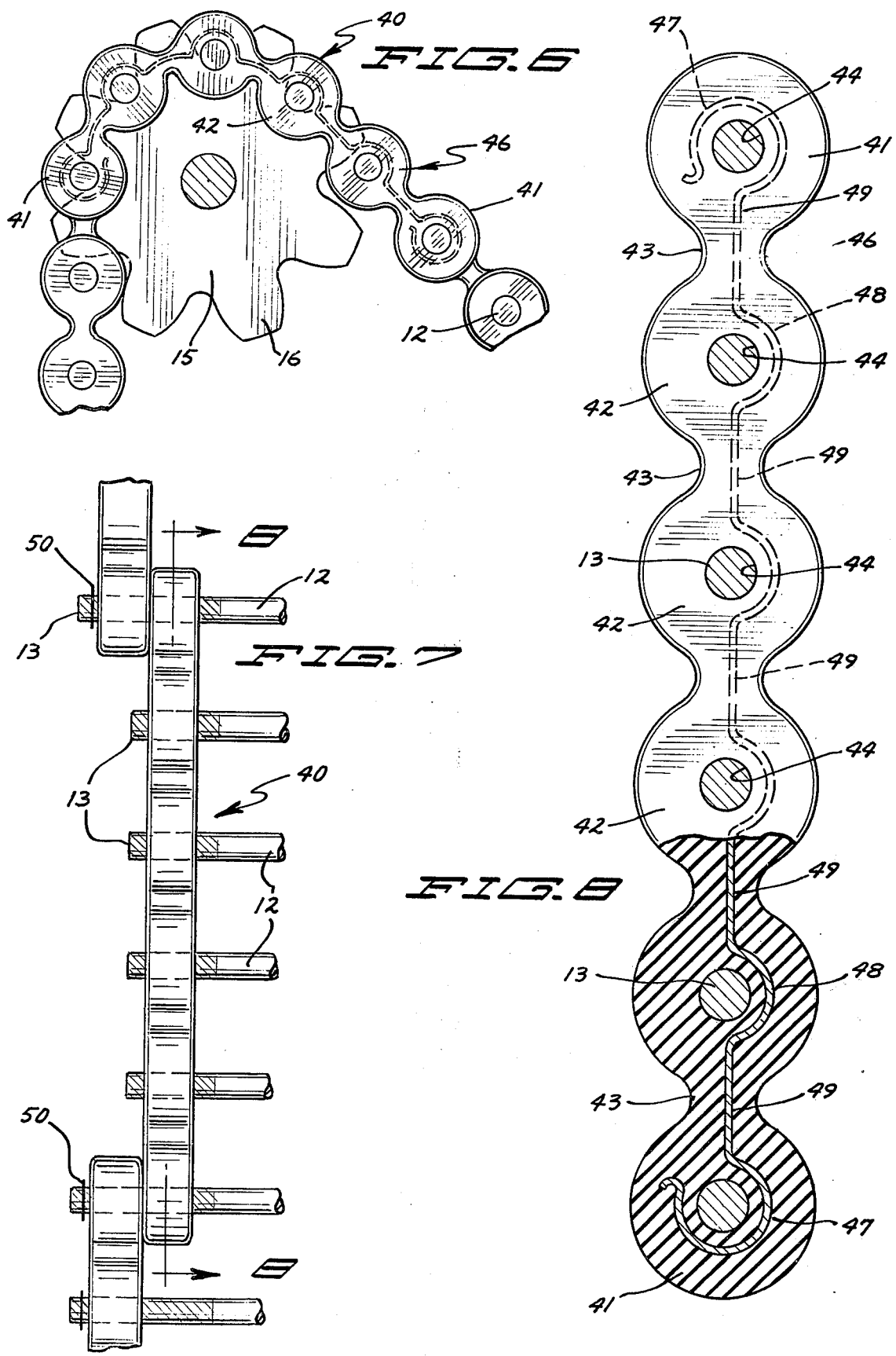

FLEXIBLE LINK CONNECTING STRUCTURE FOR CONVEYOR

SUMMARY AND BACKGROUND OF INVENTION

The invention herein relates to a flexible connecting member to connect the successive adjacent rods which comprise a conveyor such as is used in connection with a potato combine.

Conventionally, conveyors comprise links or rods which have reversely angled end portions which form hooks and which interengage one another to connect the rods and form an endless conveyor. There is constant movement and wear between said interengaging hook portions. As the wear increases, the spacing between the rods becomes irregular and out of pitch with respect to the teeth of the sprocket over which the conveyor passes with the result of the conveyor jumping off the supporting sprockets. Said wear becomes sufficient for said hook portions to break. When the hook portion of a link breaks, the entire conveyor assembly is affected. The replacement of such a link requires that the entire conveyor be loosened sufficiently and in some cases be removed partially from the machine for the replacement of a broken link. The stoppage of the operation of the machine in the field for the replacement of a broken link results in an expensive time loss.

There is constant relative movement between the interengaging hook portions of the conveyor as it moves over the sprockets and the wear of said hook portions is hastened by the presence of dirt, a very abrasive material, entering between and wearing away said hook portions.

It is an object of this invention, therefore, to provide flexible connecting means for a conveyor formed of parallelly spaced rod members.

It is another object of this invention to provide flexible connecting means for the rods making up a conveyor which make possible a quick and convenient replacement of said connecting means and/or of said rod members under field conditions without the removal of the conveyor from a combine and without special tools.

It is an object of this invention to provide connecting members for a conveyor which are separable and readily removable and individually replaceable and which permit the convenient replacement of individual of the rod members connected thereby without substantially affecting the conveyor.

It is more generally an object of this invention to provide a conveyor which comprises flexible connecting members connecting the adjacent successive rods which make up said conveyor, said connecting members each consisting of a rubber-like unitary member comprising a pair of cylindrical portions each having an axial bore therethrough and said portions having a flexible connecting web therebetween, a plate spring member extending through said web having end portions partially encircling said bores, said bores respectively receiving end portions of said rods having the same pressure fit therein and said connecting members being in overlapping relation in connecting successive adjacent pairs of said rods to form an endless conveyor.

These and other objects and advantages of the invention will be set forth in the following description made in connection with the accompanying drawings in which like reference characters refer to similar parts throughout the several views and in which:

FIG. 1 is a fragmentary view in side elevation showing a portion of a conveyor embodying the structure herein;

FIG. 2 is a fragmentary view in plan on an enlarged scale showing a portion of a conveyor chain embodying the structure herein;

FIG. 3 is a view in vertical section on an enlarged scale taken on line 3—3 of FIG. 2 as indicated;

FIG. 4 is a fragmentary exploded view on an enlarged scale of a detail of the structure herein;

FIG. 5 is a view in side elevation of an element of the structure herein showing a portion thereof in dotted line and the flexibility thereof in a change of form by dotted line;

FIG. 6 is a view similar to FIG. 1 showing a modification;

FIG. 7 is a broken view in plan showing a modified form of the structure herein;

FIG. 8 is a view in vertical section on an enlarged scale taken on line 8—8 of FIG. 7 as indicated.

DESCRIPTION OF A PREFERRED EMBODIMENT

Referring to the drawings, an endless conveyor chain 10 is indicated and is shown to be of a construction such as is suitable for use on a potato combine.

Said conveyor chain 10 comprises links 12 formed as transversely disposed longitudinally spaced rods which are held in spaced relation by connecting member 14 to be further described. The end portions 13 of said rods are non-smooth and are indicated as being knurled or scored. Said conveyor chain in forming an endless conveyor in a conventional manner will be supported by, pass over and be driven by sprockets 15 of which one is here shown. Said conveyor will be further supported by idler rollers 17.

Said sprockets directly engage and support said rods 12 and said rods will be spaced to receive the sprocket teeth 16 therebetween. It will be understood that said conveyor chain and its supporting structure will comprise a conveyor assembly and will be suitably mounted and carried as by a potato combine.

Said connecting member 14 comprises the structure which represents the subject matter of the invention herein. Said member 14 preferably will be formed of a rubber composition material suitable for the purposes herein indicated. Said connecting member consists of a pair of substantially cylindrical body portions 19 and 20 connected by an integral web portion 25 which forms a living hinge therebetween.

Said body portions 19 and 20 respectively have axial bores 22 and 23 extending therethrough with the diameters of said bores being slightly less than the diameters of said rods whereby the non-smooth end portions 13 of said rods will be forced into and through said bores under pressure for a tight fit adequate to hold said connecting members in operating position free of any relative motion or rotation with respect to said rod member. Thus foreign material is effectively prevented from entering said bores about said rod end portions therein. Said bores will be spaced apart to hold said rods in correct spaced relation for engagement by the teeth of said sprocket.

Said web will have sufficient thickness to provide an adequate hinge to hold the body portions 19 and 20 in a given spaced relation and provide sufficient flexibility for a hinge effect.

To assure a longer use life of said web and to increase its resilience or recovery to normal position from bending about a sprocket and to more positively retain the original form and spacing of the bores of said connecting member, a resilient member 27 here shown as a plate spring member is disposed within said connecting member as hereinafter described.

Referring particularly to FIG. 3, an essential element of the invention herein is present in the reinforcement of the connecting member 14 to allow a greater load than otherwise could be placed upon said member without its tendency to deform by stretching and cause a change of pitch.

A resilient spring member 27 is embodied within said member 14 and may be disposed therein in the process of forming said member 14.

Said member 27 with respect to the embodiment of the invention here presented is indicated as being formed of flat plate-like spring steel material having a central or connecting portion 28 and having curved end portions 31 spaced from and partially encircling said bores 22 and 23. Said connecting portion 28 extends through said web portion 25. The curved end portions and the connecting portion extending therebetween directly relieve the body portions 19 and 20 and the web portion 25 therebetween from bearing the full load placed upon said member 14 in forming a portion of a conveyor chain structure.

Referring to FIGS. 6-8, a modification is shown of said connecting member 14 in which like parts with respect to those above described are identified by like reference numerals.

The link member 14 above described is shown in an elongated form as member 40. Said member 40 may be of any desired length but, by way of example, it is here shown of a length to connect a half dozen conveyor rods 12.

Said member 40 comprises a plurality of substantially cylindrical end portions 41 with intermediate like portions 42, all connected by integral web portions 43 with each of said cylindrical portions having an axial bore 44 therein.

Embodied within said member 40 in like manner as with said member 40 is an elongated plate spring member 46 having curved end portions 47 at least partially or substantially encircling in spaced relation the bores of the end portions 41 and having substantially semicircular intermediate portions 48 extending about the intermediate of said bores 44. Connecting portions 49 extend between said curved portions of said member 46.

Said member 41 will be mounted in operating position in overlapping relation as in the manner of said member 14 and as illustrated in FIG. 6.

Locking rings 50 are shown on some of the rod ends 13. The use of said locking rings is optional.

OPERATION

As illustrated in FIGS. 2 and 6, said members 14 and 40 respectively are shown in operating position respectively mounted onto the rods 12 in overlapping relation with the non-smooth end portions of said rods 12 extending through the bores of said members 14 and 40. Said end portions 13 of said rods will be forced through said bores to have a sufficient pressuretype fit therein to prevent the admission of any foreign material about said rods within said bores and to prevent any relative or rotative movement of said rods with respect to said members 14 and 40. Hence, there is no rotation of the rods 12 in passing over the sprockets 15 with respect to the members 14 and 40. The web portions 25 and 43 of said members 14 and 40 provide a living hinge effect to permit the angular displacement of the substantially cylindrical portions of said members 14 and 40 in passing over said sprockets as indicated in FIGS. 1 and 6.

The resilient reinforcing members 30 and 46 are very effective in permitting the flexing of said connecting members 14 and 40 as the conveyor chain passes over the sprockets 15 without said connecting members becoming elongated so as to effect a change in pitch.

It is readily seen that in the event member 14 or 40 ruptures or becomes broken that replacement is readily effected as a replacement member is directly mounted onto the end portions of the rods 12 and is readily placed thereon as by tapping. All that will be required is a loosening of the conveyor chain.

The connecting members 14 and 40 as here presented represent a substantial improvement in the performance of a conveyor chain with a considerable reduction of breaking resulting from wear and of maintaining a truer pitch for a more effective performance of the conveyor chain.

It is particularly emphasized that no foreign material enters within the bores of the connecting members to wear the rod ends secured therein. The spring members 14 and 40 reinforce said connecting members against deformation and provide a long use life for the web portions 25 and 43. The structure herein has proved to be very successful under actual field conditions.

It will of course be understood that various changes may be made in form, details, arrangement and proportions of the parts without departing from the scope of the invention herein which, generally stated, consists in an apparatus capable of carrying out the objects above set forth, in the parts and combinations of parts disclosed and defined in the appended claims.

What is claimed is:

1. An endless conveyor structure having in combination
   sprockets comprising driving means,
   a conveyor comprising parallel spaced rods engaged and driven by said sprockets,
   a connecting member for each adjacent pair of end portions of said rods,
   each of said connecting members comprising
   a pair of spaced body portions,
   each of said body portions having a bore therethrough of lesser diameter than the diameters of said rods, said body portions being sufficiently resilient to receive said rod end portions within said bores for a pressure-tight non-rotative fit therein,
   a flexible web integral with said body portions forming a hinge therebetween, and
   resilient reinforcing means embodied within said connecting member.

2. The structure set forth in claim 1, wherein said connecting member comprises a plurality of said body portions.

3. The structure set forth in claim 1, wherein portions of said resilient means at least partially encircle the bores of each of said body portions in spaced relation thereto.

4. The structure set forth in claim 2, wherein portions of said resilient means at least partially encircle the bores of each of said body portions in spaced relation thereto.

5. The structure set forth in claim 1, wherein said resilient means comprises a spring plate member.

6. The structure set forth in claim 1, wherein
said connecting member comprises a plurality of said body portions,
said web being integral with adjacent pairs of said body portions, and
said resilient means having connected portions at least partially encircling the bore of each of said body portions.

7. A sprocket driven conveyor structure having in combination
parallel rods of uniform diameter in spaced relation,
a connecting member between adjacent end portions of said rods, each of said connecting members comprising
spaced body portions,
a bore through each of said body portions having a diameter less than the diameters of said rods,
a flexible web integral with said body portions forming a hinge therebetween, and
resilient reinforcing means embodied within said connecting member.

8. The structure set forth in claim 7, wherein
said resilient means comprises a spring plate member.

9. The structure set forth in claim 8, wherein
connected portions of said spring plate member at least partially encircle each of said bores of said body portions in spaced relation thereto.

* * * * *